US011280396B2

(12) United States Patent
Farnum

(10) Patent No.: US 11,280,396 B2
(45) Date of Patent: Mar. 22, 2022

(54) FIRE RESISTANT GEARBOX HOUSING

(71) Applicant: Rolls-Royce Corporation, Indianapolis, IN (US)

(72) Inventor: David C. Farnum, Indianapolis, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 224 days.

(21) Appl. No.: 16/682,924

(22) Filed: Nov. 13, 2019

(65) Prior Publication Data

US 2021/0140532 A1 May 13, 2021

(51) Int. Cl.
*F16H 57/04* (2010.01)
*F16H 57/03* (2012.01)

(52) U.S. Cl.
CPC ......... *F16H 57/0424* (2013.01); *F16H 57/03* (2013.01); *F16H 57/0417* (2013.01)

(58) Field of Classification Search
CPC ...... F16H 57/03; F16H 57/04; F16H 57/0412; F16H 57/0417; F16H 57/042; F16H 57/0421; F16H 57/0424; B60K 17/00
See application file for complete search history.

(56) References Cited

U.S. PATENT DOCUMENTS

| | | | |
|---|---|---|---|
| 6,422,786 B1 | 7/2002 | Grant | |
| 9,303,696 B2* | 4/2016 | Phelps | F16D 13/74 |
| 9,746,068 B2* | 8/2017 | Tahara | F16H 57/0424 |
| 9,856,971 B2* | 1/2018 | Mikami | F16H 57/0471 |
| 9,897,192 B2* | 2/2018 | Tahara | F16H 57/0457 |
| 11,022,208 B2* | 6/2021 | Matsui | B60K 6/445 |
| 11,054,018 B2* | 7/2021 | Hori | F16H 57/0424 |
| 2014/0116652 A1 | 5/2014 | Ehinger et al. | |
| 2015/0226312 A1* | 8/2015 | Chen | F16H 57/021 74/606 R |
| 2018/0163845 A1 | 6/2018 | van der Merwe et al. | |
| 2018/0163847 A1* | 6/2018 | Ahn | F16H 57/0423 |
| 2020/0400225 A1* | 12/2020 | Smith | F16H 57/021 |
| 2021/0006127 A1* | 1/2021 | Chen | F16H 57/03 |
| 2021/0180683 A1* | 6/2021 | Consani | F16H 57/0495 |

FOREIGN PATENT DOCUMENTS

| | | | | |
|---|---|---|---|---|
| DE | 102014019680 A1 | * | 6/2016 | ............ F16H 57/04 |
| DE | 102015016227 A1 | * | 4/2017 | ............ F16H 57/03 |
| DE | 102017102527 A1 | * | 8/2018 | ......... F16H 57/0452 |
| JP | 3442595 B2 | * | 9/2003 | |
| WO | WO-2015076722 A1 | * | 5/2015 | ......... F16H 57/0424 |

* cited by examiner

*Primary Examiner* — Adam D Rogers
(74) *Attorney, Agent, or Firm* — Crowell & Moring LLP

(57) ABSTRACT

A gearbox housing includes a set of ribs on an inner surface of a wall portion of the housing. During a fire event, heat received at the outside of the gearbox is transferred to the ribs, which transfer the heat away from the wall portion, in turn resisting the fire. The ribs may transfer the heat to oil, which may flow toward an oil drain. In addition or alternatively, the ribs may transfer the heat to a heat sink of the housing to which they are connected. The ribs may allow a thin region surrounding the ribs to a have a minimum thickness that is thinner than required to pass a fire test, thereby allowing for lighter weight gearbox houses that are still fire resistant.

20 Claims, 5 Drawing Sheets

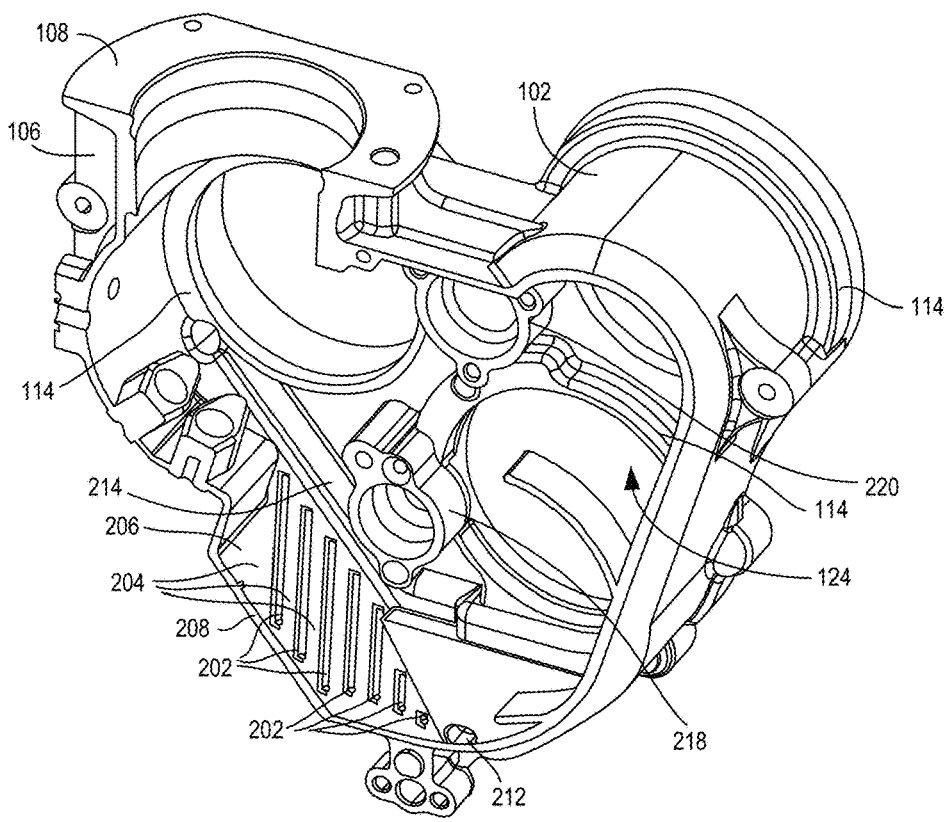
FIG. 2
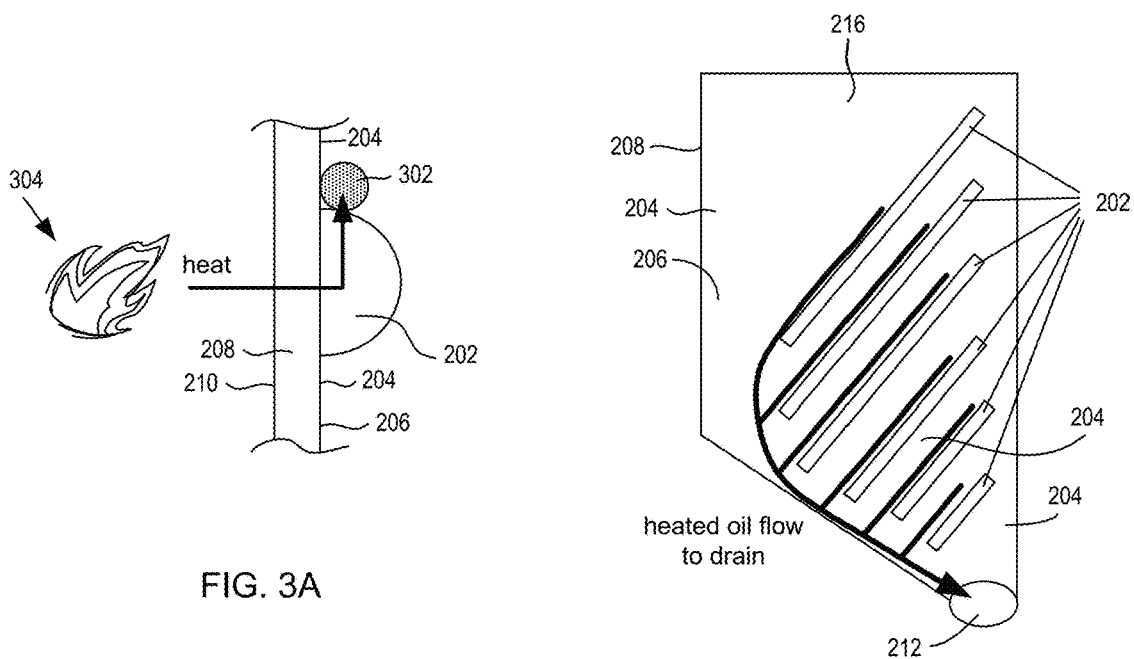
FIG. 3A
FIG. 3B

FIRE RESISTANT GEARBOX HOUSING

TECHNICAL FIELD

This disclosure relates to engine structures and, in particular, to fire resistant gearbox housings.

BACKGROUND

Various engine component designs are required to pass a fire test, which determines whether a given engine component design can withstand a fire should one break out in the engine. An engine component that passes a fire test is able to maintain its structural integrity during a fire, and is thus considered to be fire resistant.

One engine component is a gearbox, which typically contains, and seals within it, oil that serves as lubrication for the gears. During a fire, it is especially important that the gearbox housing blocks the oil from the fire, so that the oil does not exacerbate the fire. Accordingly, a gearbox housing that breaks open in response to a fire would fail a fire test.

Design improvements for an engine component design may include a requirement that the component is lighter in weight. Although removing material from the component may make it lighter, doing so could also make it unable to pass a fire test. Thus, ways to make an engine component lighter in weight while still fire resistant are desirable.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 2 illustrates a partial cross-sectional view of the gearbox housing in FIG. 1A, showing a first rib configuration having parallel oriented ribs on a lateral wall portion unconnected to a heat sink.

FIG. 3A illustrates a schematic diagram of heat from a fire transferred to oil via a rib.

FIG. 3B illustrates a top view of the rib configuration of FIG. 2, showing flow of heated oil to an oil drain.

DETAILED DESCRIPTION

The present description describes a fire-resistant gearbox housing of a gearbox that includes at least one set of ribs on an inner surface of the housing. The set of ribs may be positioned on a wall portion of the housing that is considered to be one of the most susceptible areas of failing a fire test. A wall portion having the ribs may be a portion of the housing that does not bear relatively high loads or otherwise experience relatively high stress, and so can have thin regions surrounding the ribs with a thickness that is less than a minimum thickness required to pass a fire test, resulting in lighter weight gearbox housings that are still fire resistant.

For a wall portion having a set of ribs, the ribs add thick regions to the wall portion that serve to rapidly transfer heat away from the wall portion, allowing the wall portion to be fire resistant despite having a minimum thickness lower than the required minimum thickness. The ribs described herein may quickly transfer the heat away from the wall portion in one or both of two ways. First, the ribs may transfer heat from the wall portion to nearby oil through convection, and that heated oil may move away from the wall portion, such as toward a drain, thereby removing heat from the wall portion. In addition or alternatively, the ribs may transfer heat from the wall portion to a relatively thick, heat sink structure of the housing, such as a fluid passageway wall, a pad, or a bearing support.

Figure 1A:
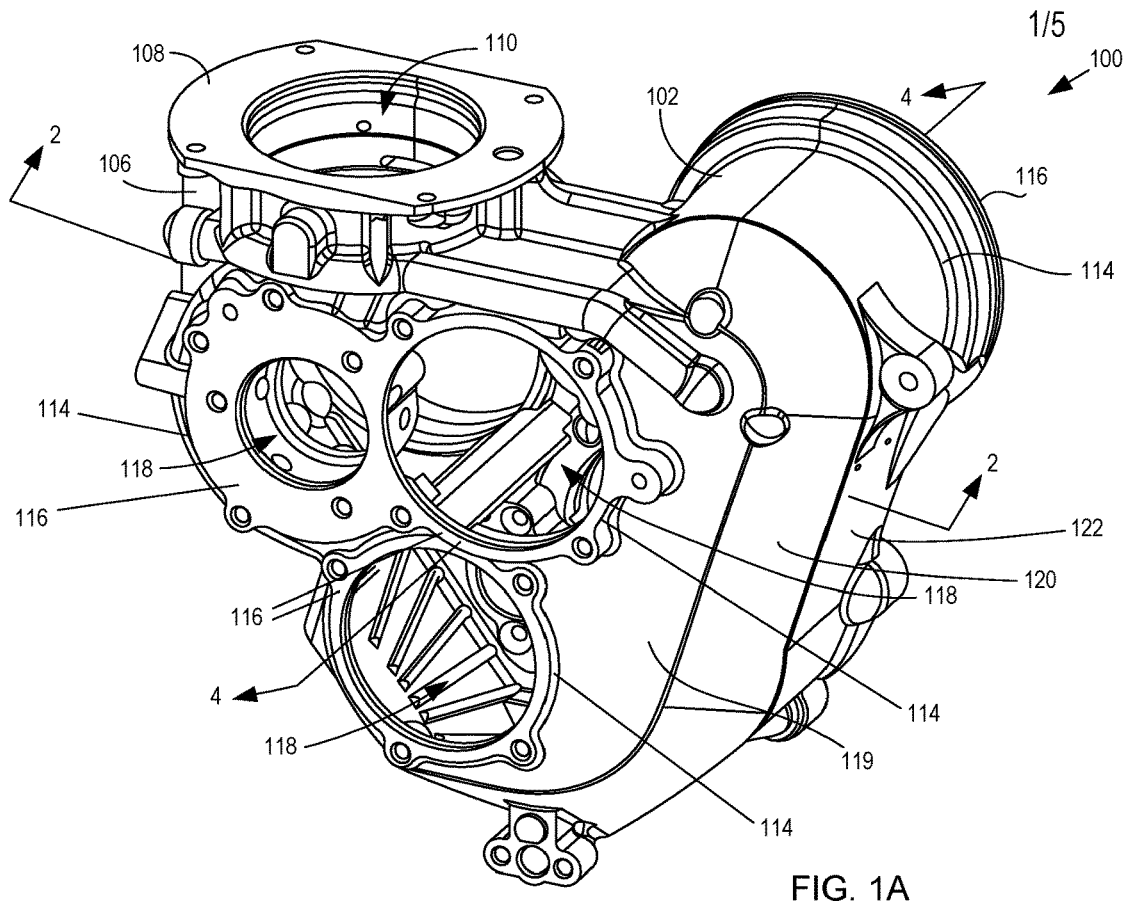
FIG. 1A illustrates a perspective view of a gearbox housing of a gearbox.
Figure 1B:
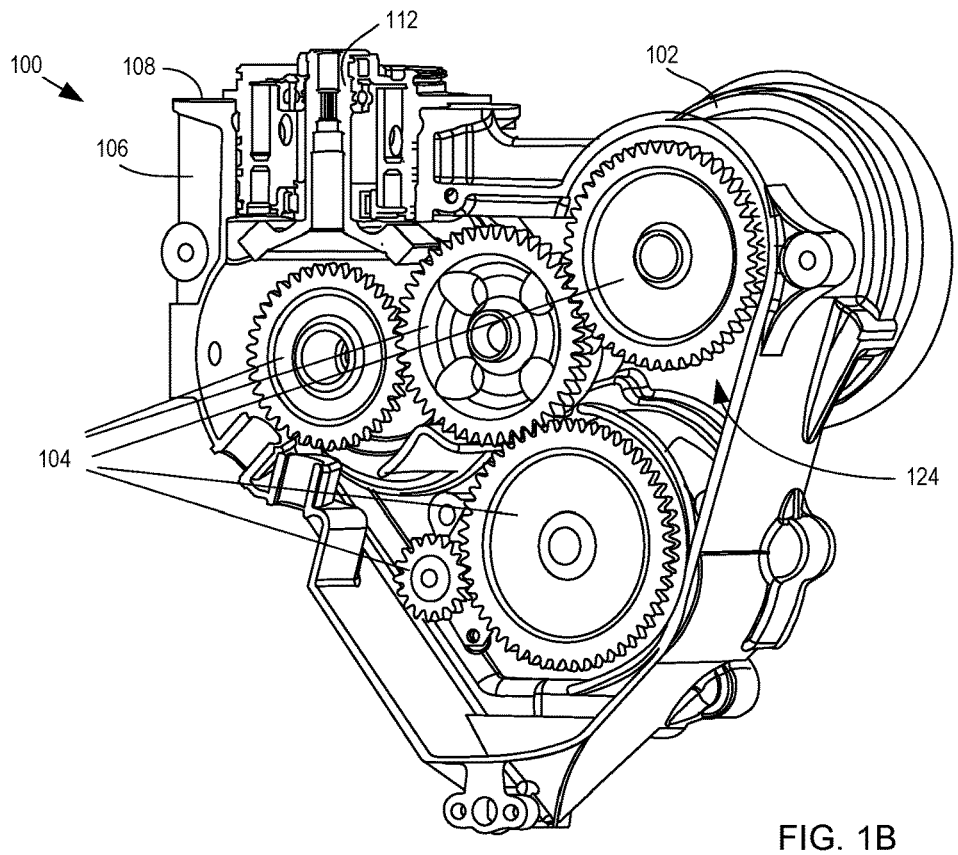
FIG. 1B illustrates a partial cross-sectional view of the gearbox housing in FIG. 1A, showing gears within the housing.

FIG. 1A shows a perspective view of a gearbox housing 102 of an example gearbox 100. When the gearbox 100 is fully assembled, the gearbox housing 102 has disposed therein a plurality of gears 104, which may be referred to as a gear train. FIG. 1A shows the housing 102 in isolation. FIG. 1B, which is a partial cross-sectional view of the gearbox 100 taken along lines 2-2, shows at least some of the gears 104 within the gearbox housing 102.

Referring to FIG. 1A, the gearbox housing 102 includes a plurality of pads that connect the gearbox 100 with other engine components or devices. In general, a pad includes a pad surface and a pad base. A pad surface (also called a pad mounting surface) is a generally flat surface that contacts or interfaces with another engine component, and/or is the surface of the gearbox housing 102 to which the other engine component is mounted. A pad base is generally the part of the pad other than the pad surface. The pad base is a sufficiently thick structure that provides structural support for stress or loads on the housing due to the other engine component being mounted to the pad surface.

For the example gearbox housing 102 in FIG. 1A, the plurality of pads includes an engine pad 106 including an engine pad surface 108 to which an engine (not shown) is mounted. The engine pad 106 defines an opening or a bore 110, in which a shaft 112 (FIG. 1B) is disposed. The shaft 112 may be connected to a rotor (e.g., a core rotor) of the engine, and also connected to the gears 104. Rotation of the shaft 112 causes the gears 104 to rotate.

The plurality of pads may also include a plurality of auxiliary or accessory pads 114, including accessory pad surfaces 116, to which engine components, that are accessories to the engine, are mounted. In this context, the example gearbox 100 may be referred to as an accessory gearbox, and the gearbox housing 102 is an accessory gearbox housing. Non-limiting example accessory components, that are accessories to the engine, include a fuel pump, fuel pump values, a fuel pump metering unit, a starter, an alternator (e.g., a permanent magnet alternator, and an oil pump. As shown in FIG. 1A, each accessory pad 114 defines a respective opening or bore 118, through which a shaft or other component extends to be connected to a gear and one of the accessory components.

Also, as shown in FIG. 1A, the accessory pads 114 are each generally oriented or positioned in one of two parallel planes. Accessory pads in the same plane have pad surfaces 116 that face in the same direction, and accessory pads 114 in different planes face in different, opposite directions. Additionally, in the example housing 102, the accessory pads 114 each face in directions perpendicular to a direction that the engine pad surface 108 faces. Also, the gears 104 are located in the space or area in between the planes.

In addition to the pads, the gearbox housing 102 also includes a plurality of wall portions (also referred to as panels or skin) that join together the pads and maintains the pads' relative positioning about the housing 102. These wall portions also function to contain lubricating oil with the gearbox assembly. Each of the wall portions may be positioned relative to the engine pad 106 and/or accessory pads 114 in various ways. Some of the wall portions, such as a wall portion 119, are positioned in the same plane (or a parallel plane) as a plane in which a set of accessory pads 114 are positioned, and/or generally surround and connect to the accessory pads 114 in the same plane and maintain their relative positioning in the same plane. Such wall portions are referred to herein as planar wall portions. Other of the wall portions, such as wall portions 120, 122, are positioned in one or more non-parallel planes to the planes in which the accessory pads 114 are positioned. Such non-parallel planes may be perpendicular to the planes in which the accessory pads 114 are positioned, or some other angle relative to the accessory pad planes, that would cause the two planes to intersect. These other wall portions, referred to herein as lateral wall portions, generally function to connect or join together the accessory pads 114 and their surrounding planar wall portions in the different planes, and also with the engine pad 106.

Also, in general, the housing 102 has an outer surface that faces outwardly external to the gearbox 100, and an inner surface that faces inwardly toward, and defines, a chamber 124 in which the gears 104 are positioned. At a given point along the outer surface or the inner surface of the housing 102, the housing 102 has an associated thickness (or wall thickness) defined by a distance between the outer and inner surfaces intersecting that point. Accordingly, the pads and the wall portions forming the housing 102 may each have one or more associated thicknesses.

The gearbox housing 102 must be fire resistant, and as such, must pass a fire test that determines whether the gearbox housing 102 is fire resistant. By being strong enough to bear loads, the pads may be inherently thick enough to allow the pads to be fire resistant. However, the wall portions do not bear the loads that the pads do, and so their thickness may be designed to have at least a minimum thickness that is fire resistant, even though they could be thinner and still maintain the structural integrity of the housing 102 (absent a fire). For example, a wall portion of a gearbox housing may have a wall thickness that is three times thicker than otherwise required in order to pass a fire test.

FIGS. 2-8B show various embodiments of the inner surface of the housing 102 having at least one set of ribs. The ribs function to transfer heat generated by a source external to the gearbox 100, such as a fire, away from a wall portion in which the ribs are positioned. Due to the heat transfer, the wall portion including the ribs can have a minimum thickness that is less than a minimum thickness required to be fire resistant, resulting in a gearbox housing 102 that is lighter in weight and yet still fire resistant.

As is shown in FIGS. 2-8B, and will be described in greater detail, a wall portion that includes a set of ribs also includes a thin region that surrounds the ribs. Each of the ribs extends inwardly from the thin region into the chamber 124, such that the wall portion is thicker over the ribs than it is over the thin region. In various embodiments, a maximum thickness of the wall portion over the ribs is at least two times greater than a minimum thickness of the wall portion over the thin region. For at least some of these embodiments, the maximum thickness over the ribs is in a range of two to five times greater (thicker) than the minimum thickness over the thin region. Additionally, in various embodiments, the thin region has a minimum thickness that is less than a minimum thickness required for the wall portion to be fire resistant. For at least some of these embodiments, the wall portion is made of aluminum, although conductive materials other than aluminum may be used in various other embodiments. Additionally, in various embodiments, the thin region of a given wall portion is solid (or is a solid structure) between the inner and outer surfaces of the thin region. For example, a solid thin region does not include holes or passageways, such as fluid passageways, extending between the inner and outer surfaces.

Additionally, a wall portion that includes a set of ribs can be defined or designated, or the wall portions can be separated or distinguished from each other, in any of various ways. In various embodiments, the thin region of a given wall portion may define a relatively smooth inner surface contour, either a flat or planar contour or a curved contour, and the wall portion may end or be bounded by another inner surface of the housing 102 that interrupts or changes the smooth contour. Example structures may be a pad, a bearing support, an oil passageway wall, or another wall portion having a thin region that extends in a different plane or defines a different smooth contour.

Also, as used herein, a rib is relatively thin conductive structure, having a length greater than a width. A rib may extend over its length in a linear or straight manner, or in a curved or curvilinear manner. Also, a rib adds thickness to a wall portion, such that the thickness of a wall portion at the rib is greater than a thickness of the wall portion at a thin region of the wall portion that at least partially surrounds the rib. Also, for some embodiments, the conductive material that a rib is made of is the same as the material of the rest of the gearbox housing 102. For example, the ribs, and the rest of the gearbox housing, is made of aluminum. In other embodiments, the conductive material that a rib is made of is different than the material of the rest of the gearbox housing 102.

Also, in some embodiments, a rib is a solid structure, while in other embodiments a rib is a hollow structure. Also, in various embodiments, a rib is configured or shaped to permit fluid to flow around it and/or over it, but not through it. In addition or alternatively, in various embodiments, a rib does not include a threaded bore and/or has disposed within it a threaded fastener, such as a bolt or a screw.

Referring particularly to FIG. 2, that figure shows a partial cross-sectional view of the housing 102 in FIG. 1 taken along lines 2-2, showing a plurality, or a set, of ribs 202, together with a thin region 204, forming an inner surface 206 of a lateral wall portion 208. (FIG. 8B shows an outer surface 210 of the lateral wall portion 208). As shown in FIG. 2, the lateral wall portion 208 having the ribs 202 extends perpendicular to the planes in which the accessory pads 114 are positioned. Also, the inner surface 206 of the lateral wall portion 208 is inclined or angularly offset relative to a direction in which the engine pad 208 faces.

Further, as shown in FIG. 2, the inner surface 206 of the lateral wall portion 208 extends "down" toward an oil drain 212. In general, for the example gearbox 100, oil may supplied from a source external to the gearbox 100 to nozzles or jets (not shown) via an oil passageway defined by an oil passageway wall 214 of the housing 102. The oil may be used to both lubricate and cool the gears 104, as well as other components, such as bearings, within the chamber 124 of the housing 102. During operation of the gearbox 100, oil may collect on the inner surface of the housing 102, including the inner surfaces of the various wall portions of the housing 102, and gravity may draw the oil on the inner surface down to the oil drain 212. The oil drain 212 may be connected to, or otherwise operate as, a scavenge pump that pumps the oil collected at the oil drain 212 outside of the chamber 124 to a cooling system (not shown) external to the gearbox 100, where the oil is cooled. At least some of the oil may flow along the inner surface 206 before reaching the oil drain 212.

In the example configuration shown in FIG. 2, the ribs 202 are oriented parallel with each other, although in other configurations, less than all or none of the ribs 202 may be parallel with each other. Also, as shown in FIG. 2, the ribs 202 extend in straight lines over their length. In other example configurations, some or all of the ribs 202 may extend in a curved manner or in a curvilinear manner over their respective lengths.

Additionally, as shown in FIG. 2, the ribs 202 are each angled with respect to a "downward" direction of gravity, other than perpendicular to the gravity direction, where such angle causes oil accumulated at a rib 202 to flow toward one of the ends of the rib 202 and eventually away from the rib 202 and toward the oil drain 212.

FIG. 3A shows a cross-section of part of the lateral wall portion 208 that includes one of the ribs 202, with an oil drop 302 in contact with and/or adjacent to the rib 202. In the event of an external fire 304, heat from the fire 304 may be conducted through the outer surface 210, through the body of the wall portion 208 to the inner surface 206, to the rib 202, and then to the oil drop 302 due to convection. Such convection may occur for several oil drops, or larger oil collections, that have accumulated adjacent to, or are in contact with, the ribs 202. As shown in FIG. 3B, the heated oil (heated from the external fire via the ribs 202), may quickly transfer the heat away from the lateral wall portion 208 by flowing along the ribs 202, toward one of the ends of the ribs 202, and then away from the ribs 202 and eventually to the oil drain 212.

As shown in FIGS. 2-3B, the thin region 204 of the inner surface 206 surrounds and/or extends between the ribs 202. In general, as is illustrated in FIGS. 2 and 3A, the thickness of the wall portion 208 over the ribs 202 is greater than its thickness over the thin region 204. For at least some embodiments, a maximum thickness of the wall portion 208 over the ribs 202 is at least twice a minimum thickness of the thin region 204, such as a portion of the thin region 204 adjacent to a rib 202. In particular embodiments, the maximum thickness of the wall portion 208 over the ribs is in a range of two to five times a minimum thickness of the thin region 204. Due to the extra material and resulting thickness provided by the ribs 202, the thickness over the thin region 204 may be less than a minimum thickness required to pass a fire test. However, due to presence of the ribs 202, the ribs 202 may allow the oil to efficiently transfer heat from the fire away from the wall portion 208 due to increased convection between the oil and housing 102. This will prevent the fire from damaging the wall portion 208 despite the thin region 204 having a minimum thickness that is less that what is required to pass a fire test. Accordingly, adding the ribs 202 may allow for a more lightweight wall portion 208 (and ultimately a lighter housing 102) while still being fire resistant.

Figure 4:
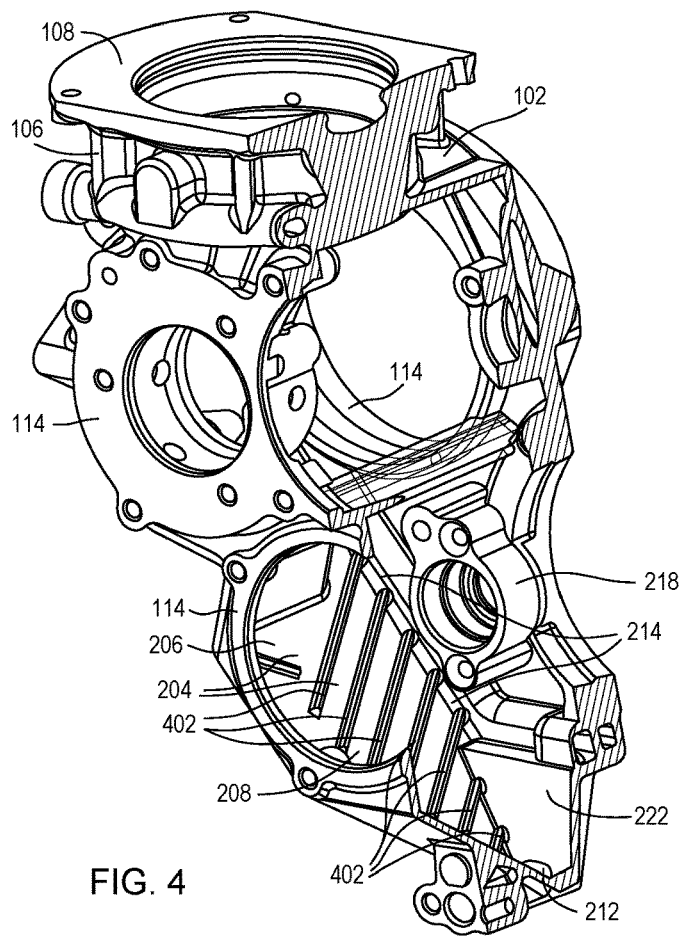
FIG. 4 illustrates a partial cross-sectional view of the gearbox housing in FIG. 1A, showing a second rib configuration having parallel oriented ribs on a lateral wall portion connected to heat sinks.

FIG. 4 shows a partial cross-sectional view of the housing 102 of FIG. 1, taken along 4-4, illustrating another example rib configuration. Similar to the configuration shown in FIG. 2, a plurality, or a set, of ribs 402 is included on the same, lateral wall portion 208. Also, like the ribs 202, the ribs 402 are positioned parallel to each other, and are angled to permit oil to flow toward first ends of the ribs 402, as previously described with reference to FIG. 3B. However, in the configuration shown in FIG. 2, the ribs 202 are unconnected from any structures of, or otherwise within, the housing 102 that can function as a heat sink (referred to as heat sink structures). Rather, as shown in FIGS. 2 and 3B, the ends from which oil flows away (not towards) terminate and are surrounded by the thin region 204.

In contrast, in the configuration in FIG. 4, the ends from which oil flows away are each connected to a heat sink structure. In general, as used herein, a heat sink structure for a gearbox housing is a structure thicker than the thin regions of the housing 102, and having sufficient thickness to cause a rib connected to it to transfer heat that the rib has received from an external heat source (e.g., a fire) to the heat sink. For at least some embodiments, a heat sink structure has a thickness in a range of three to twenty times greater than a maximum thickness of a wall portion. Accordingly, in various embodiments, a heat sink may have a thickness that is greater than a thickness of the rib to which it is connected. Though not limited to such, a heat sink structure may be an existing component of the housing 102, rather than one newly added to the housing 102, like the ribs 202/402. Example heat sink structures may include a fluid passageway wall, such as the oil passageway wall 214, a bearing support, such as bearing supports 218 or 220 (see also FIG. 2), or a pad, such as the engine pad 106 or an accessory pad 114.

In the example configuration in FIG. 4, at least some of the ribs 402 (e.g., five of the ribs) have ends connected to the oil passageway wall 214, and two of the ribs have ends connected to a planar wall portion 222 disposed between the oil passageway wall 214 and the oil drain 212. In some example configurations, such as the one shown in FIG. 4, the planar wall portion 222 has a sufficient thickness to function as a heat sink. In other example configurations, the planar wall portion 222 may have a thickness the same as or similar to the thin region 204, and so may not function as a heat sink. For such configurations, ribs may not be connected to the planar wall portion 222.

Figure 5:
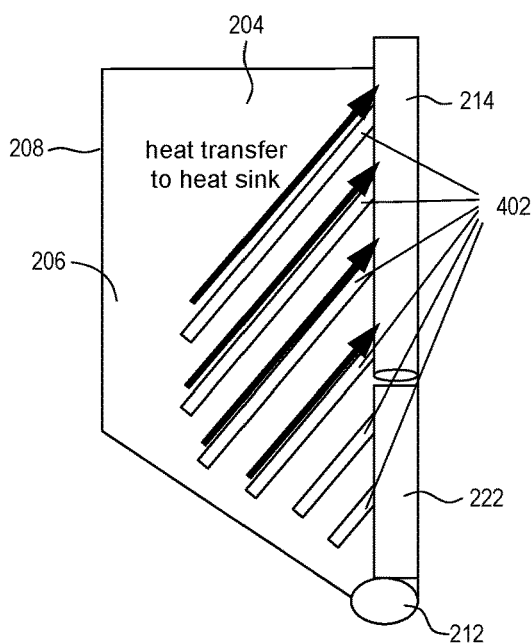
FIG. 5 illustrates a top view of the rib configuration of FIG. 4, showing heat transferred from the ribs to the heat sinks.

FIG. 5 shows a top view of the ribs 402 connected to heat sinks 214, 222. As depicted in FIG. 5, should an external fire occur, heat from the fire may be conducted to the ribs 402, and the heat sinks—i.e., the oil passageway wall 214 and the planar wall portion 222—may sink the heat away from the ribs 402, and in turn away from the lateral wall portion 208. Accordingly, by being connected to the heat sinks 214, 222, heat may be removed from the lateral wall portion 208 in one or both of two ways—by being transferred to oil that flows away from the ribs toward the oil drain 212 (as shown in FIGS. 3A, 3B), and/or by being transferred to heat sinks (oil passageway wall 214 and/or planar wall portion 222) by way of the ribs 402 connected to the heat sinks 214, 222. The configuration in FIG. 4 may similarly achieve lighter weight due to a thinner thin region 204, while still being fire resistant, like the configuration in FIG. 2.

Figure 6:
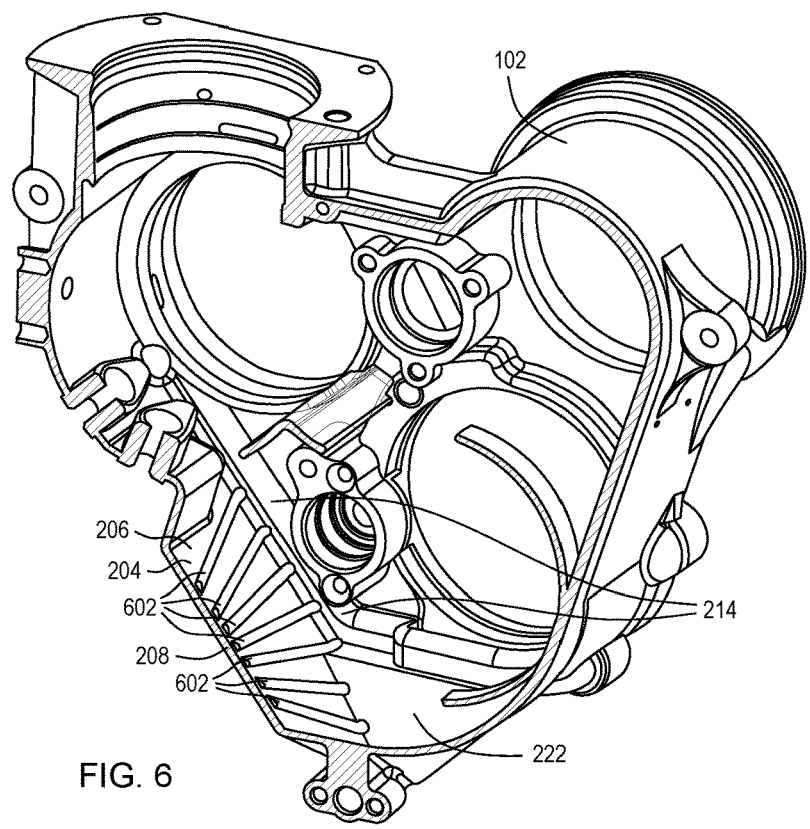
FIG. 6 illustrates a partial cross-sectional view of the gearbox housing in FIG. 1A, showing a third rib configuration having fan-out ribs on a lateral wall portion.

FIG. 6 shows a partial cross-sectional view of the housing 102 in FIG. 1, taken along line 2-2, showing another example rib configuration. Similar to the rib configurations in FIGS. 2 and 4, a plurality or a set of ribs 602 are disposed in the inner surface 206 of the later wall portion 208. Also, like the configuration in FIG. 4, the ribs 602 are connected to heat sinks, including the oil passageway wall 214 and/or the planar wall portion 222.

However, in the example configuration in FIG. 6, the ribs 602 have a fan-out orientation or disposition. In the fan-out orientation, for first ends of the ribs 602 connected to the heat sinks 214, 222, a distance between first ends of two adjacent ribs 602 is greater than a distance between opposing, second ends of the two adjacent ribs 602. Otherwise stated, a first line extending through each of the first ends of the set of ribs 602 has a length greater than a length of a second line extending through each of the second ends of the set of ribs 602. With the fan-out configuration, the second ends are positioned relatively close together, at or within a target location of the lateral wall portion 208 that may be identified as being most susceptible to a fire event. Should a fire event occur, the fan-out ribs 602 will then transfer heat from the fire to the heat sinks 214, 222 over a greater distance of the heat sinks 214, 222 than the more concentrated or focused region in which the second ends are disposed. At least some of the ribs 602 may also remove the heat through oil, as in the configurations in FIGS. 2 and 4.

Additionally, as with the configuration in FIG. 4, the set of ribs 602 may connect to only one of the heat sink structures 214, 222. For example, as with the configuration in FIG. 4, where the planar wall portion 222 is insufficiently thick to function as a heat sink, the fan-out ribs 602 may be configured to connect to only the oil passageway wall 214.

Figure 7:
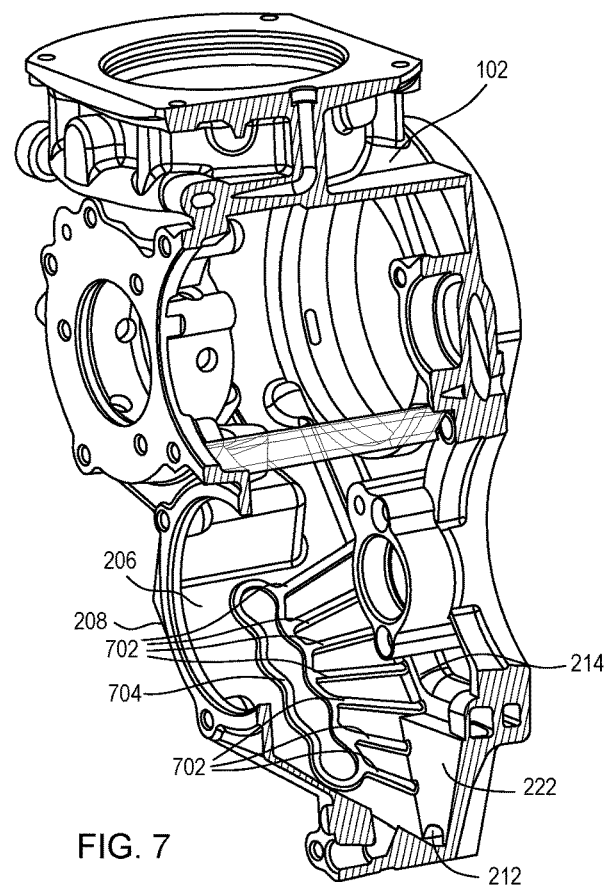
FIG. 7 illustrates a partial cross-sectional view of the gearbox housing in FIG. 1A, showing a fourth rib configuration having fan-out ribs connected to a loop rib on a lateral wall portion.

FIG. 7 shows a partial cross-sectional view of the housing 102 in FIG. 1, taken along line 4-4, showing a fourth example rib configuration. Similar to the rib configuration in FIG. 6, a plurality or set of ribs 702 are configured in a fan-out orientation and connected to the oil passageway wall 214 and the planar wall portion 222. For the configuration in FIG. 7, the second ends of the ribs 702 are connected to a loop rib 704. The loop rib 704 may have a similar width and/or add provide a similar thickness to the lateral wall portion 208 as the fan-out ribs 702. For at least some cases, the loop rib 704, in combination with the fan-out ribs 702, may more efficiently transfer heat to the heat sinks 214, 222 compared to the fan-out ribs 602 without a loop rib, as shown in FIG. 6.

Additionally, FIG. 7 shows the loop rib 704 as being a combination of rounded or horseshoe shaped ends, connected with wavy or S-shaped sides, with the second ends of the fan-out ribs 702 connected to one of the wavy sides. Other configurations of the loop rib 704 are possible. For example, the loop rib 704 may have a different shape or contour, such as a circular, oval, polygonal shape, or any of various combinations thereof. In addition or alternatively, rather than being a continuous loop as shown in FIG. 7, the loop rib 704 may be a discontinuous loop, such as by being broken or having a gap in one or more locations in the loop. In addition or alternatively, rather than connecting all of the fan-out ribs 702 to the loop rib 704, as shown in FIG. 7, in other configurations, less than all of the ribs 702 may be connected to the loop rib 704. In addition or alternatively, all or at least some of the ribs 702 may not have a fan-out orientation. For example, at least two of the ribs 702 may extend parallel to each other, or a distance between second ends of two ribs connected to the loop rib 704 may be larger than a distance between first ends connected to a heat sink. In addition or alternatively, rather than include only a single loop rib, the rib configuration may include multiple (two or more) loop ribs. Each of the ribs 702 may be connected to a respective one of the multiple loop ribs. In addition or alternatively, not all of the ribs 702 may extend in a straight line as shown in FIG. 7. Instead, at least one of the ribs 702 may have a wavy or S-shaped pattern, similar to the sides of the loop rib 704 shown in FIG. 7. Various rib configurations having one or more loop ribs are possible.

Also, various combinations of the rib configurations shown in FIGS. 2-7 may be possible. As an example, for a given set of ribs in the lateral wall portion 208, one or more ribs may be connected to a heat sink, while other ribs may be unconnected to a heat sink. As another example, for a given set of ribs in the wall portion 208, some of the ribs may be oriented parallel to each other while other ribs may be have a fan-out orientation. As another example, for a given set of ribs in the lateral wall portion 208, some ribs may be connected to a loop rib, while others are not connected to a loop rib. Various other configurations that combine two or more aspects of the different rib configurations shown in FIGS. 2-7 may be possible.

Figure 8A:
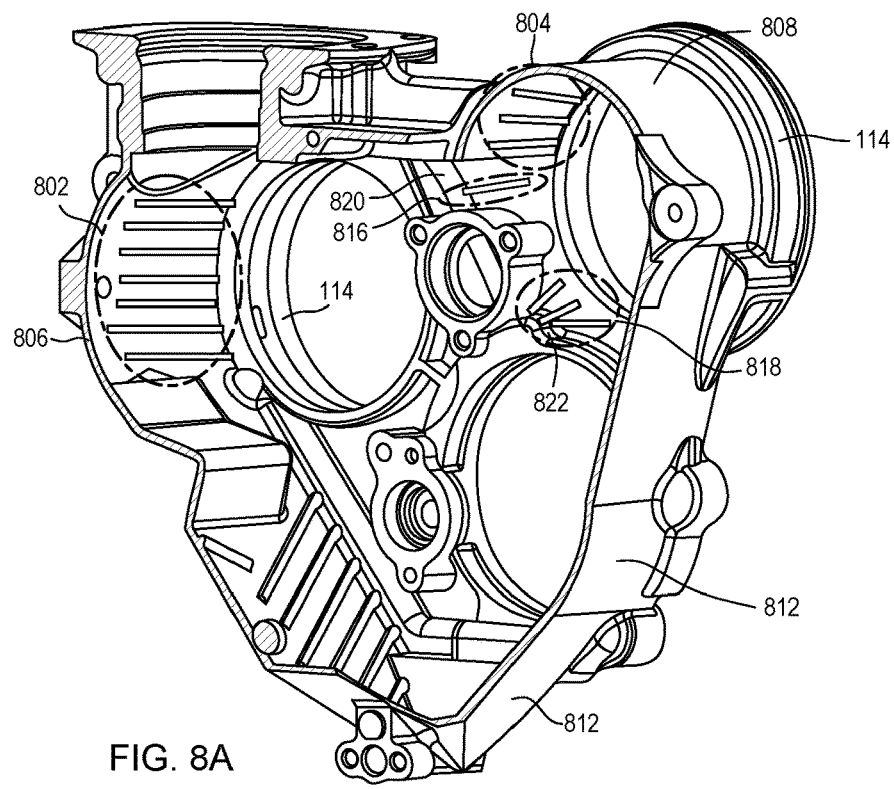
FIG. 8A illustrates a partial cross-sectional view of the gearbox housing in FIG. 1A, showing additional rib configurations on various wall portions other than the wall portion of FIGS. 2-7.
Figure 8B:
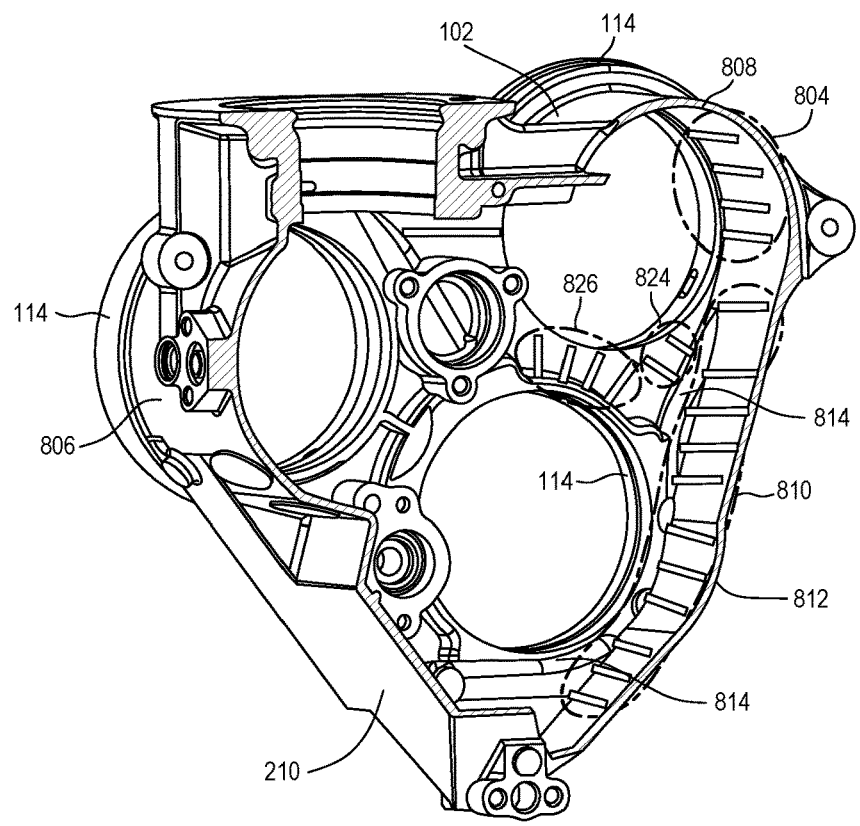
FIG. 8B illustrates a partial cross-sectional view of the gearbox housing in FIG. 1A, rotated from FIG. 8A, showing further additional rib configurations on various wall portions other than the wall portion of FIGS. 2-8.

FIGS. 8A and 8B show partial cross-sectional views, taken along line 2-2 in FIG. 1 and slightly rotated relative to each other, illustrating other wall portions of the housing 102, other than or in addition to wall portion 208, that may include ribs. In various embodiments, such as those shown in FIGS. 8A, 8B, the ribs in the other wall portions may connect to heat sink structures of the housing 102, other than, or in different locations of, the oil passageway wall 214 and/or the planar wall portion 222.

In further detail, FIGS. 8A and 8B show two sets of ribs 802, 804 forming at least part of an inner surface of a respective one of curved or rounded lateral wall portions 806, 808 of the housing 102. Each curved lateral wall portion 806, 808 may extend perpendicular to the planes in which the accessory pads 114 are positioned, and may have curved or rounded contours that surround and house a respective one of the gears 104. Also, for the example configurations shown in FIG. 8A, 8B, the ribs 802, 804 each have ends connected to a respective one of the accessory pads 114 to which the curved lateral wall portions 806, 808 are attached. Such accessory pads 114 may have sufficient thickness to function as heat sinks. Thus, in the event of an external fire, the ribs 802, 804 may transfer heat to the accessory pads 114 in order to prevent the curved lateral wall portions 806, 808 from losing their structural integrity, such as by melting or breaking open.

In addition, FIG. 8B shows a set of ribs 810 forming an inner surface of a lateral wall portion 812 that is generally opposite and faces the lateral wall portion 208 described with reference to FIGS. 2-7, and that extends down to the oil drain 212. In the example housing 102, a fluid passageway wall 814, which may be a different portion of the oil passageway wall 214, may extend adjacent to lateral wall portion 812. In other configurations, the fluid passageway wall 814 may be an entirely different fluid passageway wall for a different fluid passageway. In various embodiments as shown in FIG. 8B, the set of ribs 810 may extend and connect to the fluid passageway wall 814, which functions as a heat sink, and/or a nearby accessory pad 114.

Also, as shown in FIGS. 8A, 8B, ribs may be positioned on inner surfaces of planar wall portions oriented in parallel with the planes in which the accessory pads 114 are positioned. Such planar wall portions may be adjacent to accessory pads 114 and/or fluid passageway walls. For example, FIGS. 8A and 8B show sets of ribs 816, 818 forming inner surfaces of planar wall portions adjacent to fluid passageway walls 820, 822, each of which may be part of, or different from, the oil passageway wall 214. Another set of ribs 824 may be part of a planar wall portion and connected to fluid passageway wall 814, as shown in FIG. 8B. Also, in various embodiments, a set of ribs, such as ribs 826, may be part of an inner surface of a planar wall portion, such that the ribs 826 are circumferentially positioned around and connected to an associated accessory pad 114. Like the rib configurations in FIGS. 2, 4, and 6, the wall portions having the ribs may also include thin regions surrounding the ribs. Such combination of ribs and thin regions may allow for a lighter weight, but still fire resistant, gearbox housing.

The rib configurations shown in FIGS. 2-8B provide non-limiting examples, and various other rib configurations forming inner surfaces for any of various wall portions are possible. For example, various embodiments may have at least one, but not all of the sets of ribs shown in FIGS. 8A, 8B. Also, for a given set of ribs in a given wall portion, the number of ribs, the spacing between the ribs, and the amount of surface area that the ribs cover can vary across various embodiments, and may be the same as or different than those features as they are illustrated in FIGS. 2-8B. As an example illustration, the set of ribs 804 positioned in curved lateral wall portion 808 may alternatively extend only partially around the curved contour of the inner surface of the curved lateral wall portion 808, rather than substantially all around the curved contour as shown in FIGS. 8A, 8B. Also, for the configuration shown in FIGS. 8A, 8B, the ribs in a given set are shown as extending parallel with each other. In other example configurations, the ribs in a given set may have a fan-out configuration like in FIGS. 6 and 7, be attached to a rib loop like in FIG. 7, and/or have a certain angular offset to cause oil to flow to certain ends of the ribs and eventually away from the ribs and toward the oil drain 212, like the rib configurations in FIGS. 2 and 4. Various ways, or combinations of ways, of orienting one or more sets of ribs in inner surfaces of planar and/or lateral wall portions of the gearbox housing 102 may be possible.

Also, the gearbox housing 102 is one example type of gearbox housing, and the various sets of ribs shown in FIGS. 2-8B can be similarly implemented in inner surfaces of any of a variety of gearbox housings that house gears and have pads in any of a variety of vehicles adapted for land, air, or water, in turn allowing for lighter weight gearbox housings that are still fire resistant.

Additionally, a common manufacturing process to manufacture gearbox housings, including aluminum gearbox housings, is casting. However, casting processes may have limitations that would inhibit manufacturing a gearbox housing with ribs, such as those shown and described in the figures, having thin regions that are as thin as they could be and still be fire resistant. As a result, if casting were used to manufacture the above described gearbox housings with ribs, the thin regions may be thicker than necessary, resulting in a gearbox housing that is heavier than it has to be. As an alternative, additive manufacturing (or additive layer manufacturing (ALM)) may be used to manufacture the above described gearbox housings with ribs, and if used, could produce gearbox housings that have thinner thin regions than those made by casting. As such, manufacturing the above described gearbox housings with ribs using additive manufacturing processing, rather than casting, may allow for thin regions having optimally minimal thicknesses, and as a result, optimally light weight yet still fire resistant gearbox housings.

While various embodiments have been described, it will be apparent to those of ordinary skill in the art that many more embodiments and implementations are possible. Accordingly, the embodiments described herein are examples, not the only possible embodiments and implementations.

The subject matter of the disclosure may also relate, among others, to the following aspects:

A first aspect relates to a gearbox comprising: a gearbox housing defining a chamber in which a plurality of gears are disposed, the gearbox housing comprising: a plurality of pads; and a plurality of wall portions, wherein a wall portion of the plurality of wall portions comprises an outer surface and an inner surface. The inner surface comprises a set of ribs and a solid thin region surrounding the set of ribs, the wall portion thicker over the set of ribs than over the solid thin region.

A second aspect relates to a fire resistant method for a gearbox that comprises: receiving, with an outer surface of a wall portion of a gearbox housing, heat from a fire; transferring the heat from the outer surface to a set of ribs of the wall portion; and transferring the heat from the set of ribs to a heat sink of the gearbox housing.

A third aspect relates to a fire resistant method for a gearbox that comprises: receiving, with an outer surface of a wall portion of a gearbox housing, heat from a fire; transferring the heat from the outer surface to a set of ribs of the wall portion; transferring the heat from the set of ribs to oil near the set of ribs; and flowing the oil from the set of ribs to an oil drain.

In some aspects, the wall portion comprises a lateral wall portion.

In some aspects, the lateral wall portion extends to the oil drain of the gearbox housing.

In some aspects, the lateral wall portion comprises a curved lateral wall portion that surrounds a gear of the plurality of gears.

In some aspects, the wall portion comprises a planar wall portion.

In some aspects, the ribs are parallel with each other.

In some aspects, the ribs are configured in a fan-out orientation.

In some aspects, the set of ribs is connected to a loop rib.

In some aspects, the gearbox housing further comprises a fluid passageway wall, wherein at least one of the ribs is connected to the fluid passageway wall.

In some aspects, at least one of the ribs is connected to a pad.

In some aspects, the set of ribs is circumferentially disposed around the pad.

In some aspects, a maximum thickness of the wall portion over the set of ribs is at least two times greater than a minimum thickness of the wall portion over the solid thin region.

In some aspects, the maximum thickness is in a range of two to five times greater than the minimum thickness.

In addition to the features mentioned in each of the independent aspects enumerated above, some examples may show, alone or in combination, the optional features mentioned in the dependent aspects and/or as disclosed in the description above and shown in the figures.

What is claimed is:

1. A gearbox comprising:
 a gearbox housing defining a chamber in which a plurality of gears are disposed, the gearbox housing comprising:
  a plurality of pads; and
  a plurality of wall portions, wherein a wall portion comprises an outer surface and an inner surface,
  wherein the inner surface comprises a set of ribs and a solid region surrounding the set of ribs, the wall portion thicker over the set of ribs than over the solid region,
  wherein a maximum thickness of the wall portion over the set of ribs is at least two times greater than a minimum thickness of the wall portion over the solid region.

2. The gearbox of claim 1, wherein the wall portion comprises a lateral wall portion.

3. The gearbox of claim 2, wherein the lateral wall portion extends to an oil drain of the gearbox housing.

4. The gearbox of claim 2, wherein the lateral wall portion comprises a curved lateral wall portion that surrounds a gear of the plurality of gears.

5. The gearbox of claim 1, wherein the wall portion comprises a planar wall portion.

6. The gearbox of claim 1, wherein the ribs are parallel with each other.

7. The gearbox of claim 1, wherein the ribs are configured in a fan-out orientation.

8. The gearbox of claim 7, further comprising a loop rib, wherein the set of ribs is connected to the loop rib.

9. The gearbox of claim 1, wherein the gearbox housing further comprises a fluid passageway wall, wherein at least one of the ribs is connected to the fluid passageway wall.

10. The gearbox of claim 1, wherein at least one of the ribs is connected to a pad of the plurality of pads.

11. The gearbox of claim 1, wherein the set of ribs is circumferentially disposed around a pad of the plurality of pads.

12. The gearbox of claim 1, wherein the maximum thickness is in a range of two to five times greater than the minimum thickness.

13. A gearbox comprising:
 a gearbox housing defining a chamber in which a plurality of gears are disposed, the gearbox housing comprising:
  a plurality of pads, wherein at least two pads of the plurality of pads are positioned in a first plane; and
  a plurality of wall portions comprising a planar wall portion and a lateral wall portion, the planar wall portion positioned in the first plane or in a second plane parallel with the first plane, the lateral wall portion positioned non-parallel with the first plane, wherein the lateral wall portion comprises an outer surface and an inner surface;
  a fluid passageway wall adjacent to the inner surface of the lateral wall portion;
  the lateral wall portion comprising a set of ribs longitudinally extending over the inner surface, and a solid region surrounding the set of ribs, the lateral wall portion thicker over the set of ribs than over the solid region, wherein at least two ribs of the set of ribs are connected to, and longitudinally extend away, from the fluid passageway wall.

14. A fire resistant method for a gearbox, the method comprising:
 receiving, with an outer surface of a wall portion of a gearbox housing, heat from a fire;
 transferring the heat from the outer surface to a set of ribs of the wall portion; and
 transferring the heat from the set of ribs to a heat sink of the gearbox housing.

15. The fire resistant method of claim 14, wherein the ribs are configured in a fan-out orientation.

16. The fire resistant method of claim 14, wherein the heat sink comprises a fluid passageway wall.

17. The fire resistant method of claim 14, wherein the heat sink comprises a pad.

18. The fire resistant method of claim 14, wherein transferring the heat from the set of ribs comprises transferring a portion of the heat from the set of ribs to oil.

19. A fire resistant method for a gearbox, the method comprising:
 receiving, with an outer surface of a wall portion of a gearbox housing, heat from a fire;
 transferring the heat from the outer surface to a set of ribs of the wall portion;
 transferring the heat from the set of ribs to oil; and
 flowing the oil from the set of ribs to an oil drain.

20. The method of claim 19, wherein the ribs are parallel with each other.

* * * * *